(12) United States Patent
Schlack

(10) Patent No.: US 12,196,591 B2
(45) Date of Patent: Jan. 14, 2025

(54) LIFTING SYSTEM FOR METERING A FLUID FROM A CONTAINER AND CONTAINER FOR A FLUID

(71) Applicant: SMIICS GMBH, Göttingen (DE)

(72) Inventor: Stefan Schlack, Göttingen (DE)

(73) Assignee: SMIICS GMBH, Göttingen (DE)

( * ) Notice: Subject to any disclaimer, the term of this patent is extended or adjusted under 35 U.S.C. 154(b) by 148 days.

(21) Appl. No.: 17/766,046

(22) PCT Filed: Oct. 5, 2020

(86) PCT No.: PCT/EP2020/077764
§ 371 (c)(1),
(2) Date: Apr. 1, 2022

(87) PCT Pub. No.: WO2021/064233
PCT Pub. Date: Apr. 8, 2021

(65) Prior Publication Data
US 2022/0364897 A1    Nov. 17, 2022

(30) Foreign Application Priority Data

Oct. 4, 2019  (DE) ...................... 20 2019 004 089.7
Mar. 13, 2020  (DE) ...................... 10 2020 001 711.8

(51) Int. Cl.
*G01F 11/02*    (2006.01)
*A47J 31/40*    (2006.01)
(Continued)

(52) U.S. Cl.
CPC ............ *G01F 11/021* (2013.01); *B01F 23/53* (2022.01); *B01F 23/59* (2022.01); *B01F 23/711* (2022.01); *B01F 23/808* (2022.01); *B01F 27/91* (2022.01); *B01F 35/2112* (2022.01); *B01F 35/2132* (2022.01); *B01F 35/2215* (2022.01); *B01F 35/45* (2022.01); *B01F 35/51* (2022.01); *B01F 35/513* (2022.01); *B01F 35/717613* (2022.01); *B01F 35/71775* (2022.01);
(Continued)

(58) Field of Classification Search
None
See application file for complete search history.

(56) References Cited

U.S. PATENT DOCUMENTS 3,059,586 A * 10/1962 Brailsford ................ G01N 1/14
417/465
3,134,508 A * 5/1964 Bayer ................... F04B 43/107
222/144.5
(Continued)

FOREIGN PATENT DOCUMENTS

AT    515751 A1    11/2015
DE    2741803 A1    3/1979
(Continued)

*Primary Examiner* — Paul R Durand
*Assistant Examiner* — Michael J. Melaragno
(74) *Attorney, Agent, or Firm* — Dilworth & Barrese, LLP

(57) ABSTRACT

Presented and described herein is a stroke system (1) for dosing a fluid from a container (3), comprising a piston pump (5) with a piston (7), so that a fluid can be dosed from a container (3) by displacement of the piston (7), and a temperature control device (29) for controlling the temperature of the fluid to be dosed by means of the stroke system (1).

18 Claims, 7 Drawing Sheets

Figure 1:
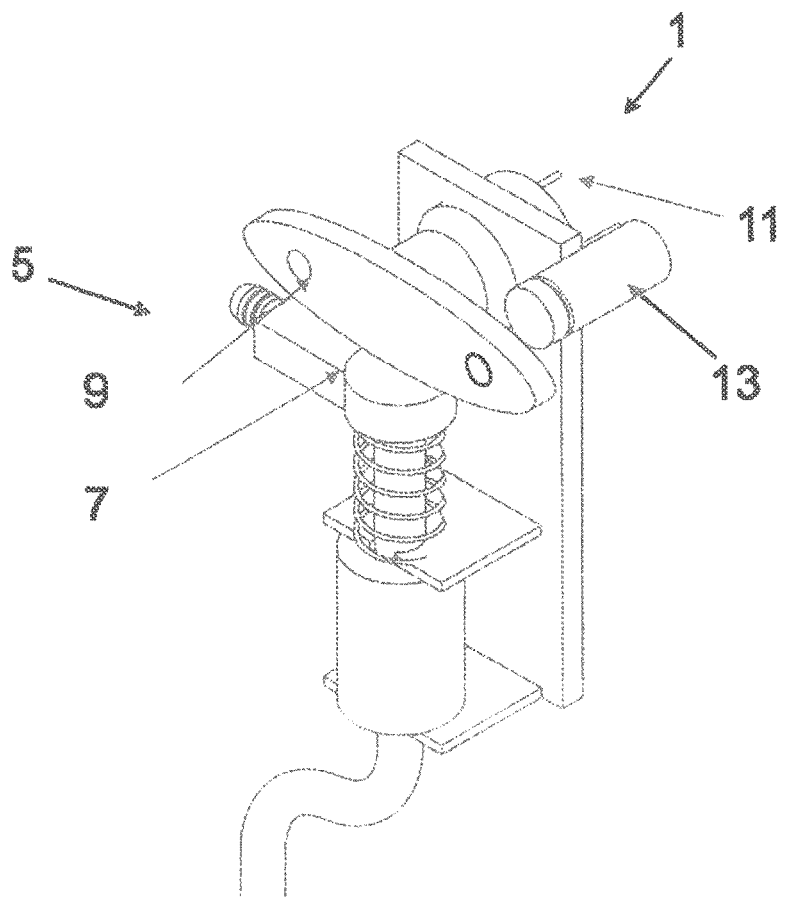

(51) Int. Cl.
| | |
|---|---|
| *B01F 23/50* | (2022.01) |
| *B01F 23/53* | (2022.01) |
| *B01F 23/70* | (2022.01) |
| *B01F 23/80* | (2022.01) |
| *B01F 27/91* | (2022.01) |
| *B01F 35/21* | (2022.01) |
| *B01F 35/221* | (2022.01) |
| *B01F 35/45* | (2022.01) |
| *B01F 35/51* | (2022.01) |
| *B01F 35/513* | (2022.01) |
| *B01F 35/71* | (2022.01) |
| *B01F 35/88* | (2022.01) |
| *B01F 35/92* | (2022.01) |
| *F04B 13/00* | (2006.01) |
| *F04B 23/02* | (2006.01) |
| *F04B 41/02* | (2006.01) |
| *F04B 53/08* | (2006.01) |
| *G01F 11/00* | (2006.01) |
| *B01F 35/90* | (2022.01) |

(52) U.S. Cl.
CPC ........ *B01F 35/718* (2022.01); *B01F 35/8822* (2022.01); *B01F 35/92* (2022.01); *F04B 13/00* (2013.01); *F04B 23/02* (2013.01); *F04B 41/02* (2013.01); *F04B 53/08* (2013.01); *G01F 11/006* (2013.01); *A47J 31/402* (2013.01); *B01F 2035/99* (2022.01)

(56) References Cited

U.S. PATENT DOCUMENTS

| | | | | |
|---|---|---|---|---|
| 3,790,028 A | * | 2/1974 | Gardner, Jr. | ......... B67D 1/1231 222/129.4 |
| 3,880,329 A | * | 4/1975 | Gardner, Jr. | .......... G01F 11/021 222/325 |
| 4,436,230 A | * | 3/1984 | Hofmann | ............... F04B 49/007 222/614 |
| 5,022,558 A | * | 6/1991 | Faerber | ................ B67D 3/0032 222/105 |
| 5,778,765 A | * | 7/1998 | Klawuhn | .............. A47J 31/469 99/290 |
| 8,896,424 B2 | | 11/2014 | Reif et al. | |
| 9,212,827 B2 | * | 12/2015 | Garvey | ................. F24H 1/0018 |
| 9,723,947 B2 | * | 8/2017 | Garvey | ................. F24H 15/219 |
| 10,723,989 B2 | | 7/2020 | Schaefer et al. | |
| 11,033,141 B2 | * | 6/2021 | Schlack | .................. A47J 31/407 |
| 2008/0110935 A1 | | 5/2008 | Huber et al. | |
| 2021/0401220 A1 | * | 12/2021 | Schlack | ................... A47J 31/42 |
| 2022/0034016 A1 | * | 2/2022 | Schlack | ................... A47J 31/40 |
| 2022/0364897 A1 | * | 11/2022 | Schlack | .................. B01F 35/51 |
| 2022/0370966 A1 | * | 11/2022 | Schlack | ................ B01F 33/846 |

FOREIGN PATENT DOCUMENTS

| | | | | |
|---|---|---|---|---|
| DE | 29611088 U1 | | 1/1997 | |
| DE | 202005015569 U1 | | 1/2006 | |
| DE | 102007050920 B3 | | 12/2008 | |
| DE | 102008039491 A1 | | 4/2010 | |
| DE | 102008056300 A1 | | 6/2010 | |
| DE | 102008062741 A1 | | 7/2010 | |
| DE | 102012212570 A1 | | 1/2014 | |
| DE | 102015008766 A1 | | 1/2017 | |
| DE | 102016000406 A1 | | 7/2017 | |
| DE | 202019004089 U1 | * | 2/2021 | ............. A47J 31/402 |
| EP | 1938054 A1 | | 11/2010 | |
| EP | 3193015 B1 | | 11/2018 | |
| WO | 2007/039378 A1 | | 4/2007 | |
| WO | 2008/090139 A1 | | 7/2008 | |

* cited by examiner

LIFTING SYSTEM FOR METERING A FLUID FROM A CONTAINER AND CONTAINER FOR A FLUID

The present application relates to a stroke system for dosing a fluid from a container, and a container for a fluid connected or connectable to a stroke system.

Precise and accurate dosing of fluid plays a major role in a wide range of applications. For example, when preparing baby food from a baby food concentrate, a corresponding amount of concentrate is measured or dosed and mixed with water before the baby food is administered. Or, for example, in the preparation of coffee, an appropriate amount of coffee powder or coffee beans must be measured or dosed and mixed with a desired amount of water. The exact and precise dosing of a fluid also plays a major role in the biochemical field in research and development laboratories, for example in the preparation of a liquid medium or a buffer.

In addition to the exact and precise dosing of the fluid, the fluid or the water having a certain temperature plays a major role in all the areas described above. The baby food prepared from the baby food concentrate should have a temperature of about 37° C. (degrees Celsius) to be ready for consumption by the baby. When preparing coffee, the water should ideally be tempered to a temperature of about 86 degrees, preferably about 93 to 96 degrees, and then the temperature should be kept constant to ensure an optimal extraction temperature. The temperature of the fluid used also plays a major role when preparing a mixture of substances, for example a liquid medium or buffer. When preparing a medium, the fluid should generally have a temperature of about 37° C. Often the fluid to be used is frozen before use, so it is desirable to heat the fluid to the desired temperature as quickly as possible for use.

Therefore, in addition to being able to accurately and precisely meter a fluid for all of the applications described above, it is also desirable to be able to quickly and reliably temper the fluid to a specific temperature at the same time.

Dosing and preparation means that the individual ingredients are mixed or dissolved in each other, heated and/or otherwise made ready for consumption. It is also important that the ingredients can be prepared in a sterile manner. In particular, when tap water is used as fluid, for example in the preparation and dosing of baby food and of coffee, the individual components, for example lines of the dosing and preparation devices, can calcify if the water contains a lot of lime. In addition, the fluid used to prepare baby food, coffee or a medium should also be administered in a sterile and germ-free state.

Therefore, all components that come into contact with the fluid or powder must be cleaned and/or decalcified regularly.

From DE 10 2018 009 551.8, a device for dosing and/or preparing baby food, in particular baby milk or baby porridge, is known. DE 10 2019 001 063.9 describes a device for dosing and grinding coffee beans and/or for preparing coffee, in particular filter coffee.

Based on the prior art, it is the task of the present invention to enable a simplified and safe controlling of the temperature and dosing of a fluid.

According to the invention, this task is solved by the object of the independent claims. Preferred embodiments result from the dependent claims.

In accordance with one aspect of the invention, there is provided a stroke system for dosing a fluid from a container, comprising: a piston pump having a piston such that a fluid can be dosed from a container by a displacement of the piston; and temperature control means for temperature controlling the fluid to be dosed by the reciprocating system.

In addition to the piston, the piston pump can comprise a turntable, the piston being deflectable by means of the turntable. The swivel plate may be reusable and connected to the motor. The piston pump may be connected or connectable to the pivot plate. For example, the piston pump may be detachably connected to the turntable, for example by both elements being clicked together. However, it is also conceivable that the piston pump is firmly connected, for example glued, to the turntable. As an alternative to the turntable, the stroke system or the piston pump can also be driven linearly, for example by means of a lifting magnet or a servo drive.

Thus, by means of the stroke system, pressure can be exerted on a container for a fluid with the aid of a pump mechanism, so that the fluid can be dosed correctly. However, it is also conceivable that pressure can be exerted on the container by means of a rotary mechanism or another mechanism so that the fluid can be dosed correctly and in a particularly easy-to-implement manner. The stroke system can dose the fluid by means of the piston pump. The turntable can be driven by means of a motor and exert a pressure on the piston. Instead of a turntable, a camshaft can also be provided, or a solenoid or a servo drive. The piston can be connected to the container in such a way that the piston is deflected or moved by the turntable. This deflection or movement allows the fluid to be pumped out of the container and dosed correctly.

The stroke system can be designed to dispense a discrete or predefined amount of fluid, wherein, preferably, the discrete or predefined amount of fluid can be dispensed with a stroke or piston stroke. By stroke is meant the distance that the piston travels during a reciprocation or the distance that the piston travels during the deflection. However, it is also conceivable that the discrete or predefined quantity cannot be dispensed with one stroke, but can be dispensed with more than one stroke or with several strokes.

This stroke system can be used to dispense a wide range of fluids. For example, the fluid to be dosed by means of the stroke system can be a fluid for preparing baby food from a baby food concentrate, or a fluid for preparing coffee from a coffee powder, in particular from coffee beans that have been ground shortly beforehand. The fluid is in particular water, although other fluids are also conceivable. Furthermore, the fluid may be a fluid for preparing a mixture of substances, for example a medium or a buffer. This list is not intended to be limiting. It is conceivable that any type of fluid can be dosed by means of the stroke system, especially if the fluid is to be tempered, i.e., heated or cooled, to a specific temperature. For this purpose, the stroke system has a temperature control for controlling the temperature of the fluid to be dosed by means of the stroke system.

This design enables exact, precise and particularly simple dosing of the fluid by means of the piston pump. Simultaneously with the dosing or with a time delay, for example immediately or shortly before the dosing or immediately or shortly after the dosing by means of the piston pump, the fluid in the container can be tempered to a desired temperature by means of the temperature control and/or kept at this temperature for a longer period of time. Thus, by means of the reciprocating system, the fluid can not only be dosed, but at the same time be tempered to the desired temperature. This allows a fluid to be brought to the desired consumption temperature, for example when preparing baby food or coffee. Furthermore, the stroke system also enables particularly efficient and time-saving dosing and controlling of the temperature of the fluid. Particularly in the field of biochemistry, for example in the preparation of a mixture of substances, such as a medium or a buffer, longer downtimes are thus avoided and efficient work is made possible.

Preferably, the stroke system comprises a container for a fluid, the stroke system being connected or connectable to the container, wherein, preferably, the stroke system is connected or can be connected to an first opening on the container.

The stroke system can be firmly connected or connectable to the container inside which the fluid to be dosed and tempered is located. For example, the stroke system can be connected or connectable in a germ-tight manner to an first opening on the container, for example the outlet opening of the container from which the fluid can be removed. For this purpose, the stroke system can be connected to the first opening in a fixed or detachable manner, for example by gluing or screwing, so that the interior of the container is with fluid connection to the stroke system, for example via hoses or other fluid-carrying lines. Hoses and other fluid-carrying lines can be dispensed with, especially if the stroke system is arranged under the container in the direction of gravity. In this case, the piston pump or piston can be filled gravimetrically. In this way, the fluid can be easily pumped from inside the container and dosed.

Due to the fact that the stroke system is connected or can be connected to the container for a fluid, the stroke system with container can also be used for various devices known from the prior art or the stroke system can be combined with these devices.

For example, the stroke system can be connectable or connected to a device for dosing baby food (as described in application DE 10 2018 009 551.8). This enables the preparation and dosing of baby food, whereby the fluid can be tempered to a drinking temperature of about 37° C. by means of the temperature control. In the case that the fluid is already sterile, heating to 37° C. is sufficient. In the case that the fluid should not be sterile, for example tap water, the fluid could first be sterilized or boiled by means of the temperature control and then cooled to the drinking temperature and kept at this temperature. By means of the stroke system, preferably, in one step or stroke or in multiple steps or strokes, a discrete or predefined amount of 30 ml of fluid can be dispensed from the container and mixed with a corresponding amount of baby food concentrate. However, other amounts of fluid are also conceivable, consistent with the preparation specifications of the baby powder manufacturers, for example 60 ml, 90 ml, 120 ml, 150 ml, 180 ml, or 210 ml. This can be achieved by using pistons with corresponding volumes, so that the corresponding volume of fluid can be dosed by means of a stroke. However, it is also conceivable that several strokes are required to dispense the discrete or predefined quantity. Further dosing quantities or stroke settings are conceivable. Thus, the desired quantities of fluid for the preparation of baby food, for example in a device for dosing and preparing baby food, can be provided by means of the stroke system in a particularly fast and safe manner.

Furthermore, the stroke system can be connectable or connected to a device for dosing coffee (as described in application DE 10 2019 001 063.9). This enables the preparation and dosing of coffee, whereby the fluid from the container can ideally be tempered to above 86° C. in "one go" by means of the temperature control, preferably 93 or 96° C., and thereafter the temperature can be kept constant for a certain time. This enables an optimum extraction temperature for coffee. Furthermore, the optimum brewing temperature for the respective coffee can be set by means of the temperature control. This is advantageous because if the brewing temperature is too high, more bitter substances are dissolved from the coffee. This can make the coffee undrinkably strong and/or bitter. If the coffee water is too cold, important aroma substances cannot be sufficiently extracted from the coffee. The coffee can then taste bland, lukewarm or sour, even with longer brewing times and high-quality coffees. To a certain extent, however, how hot coffee water should be is always a matter of taste. A little experimentation may well be in order here, so that by means of the temperature control, in particular by means of a temperature control or temperature regulating device, the fluid and thus the coffee can be tempered manually or automatically to the desired temperature of the respective user.

Furthermore, the stroke system can be connectable or connected to a device for preparing a mixture of substances, for example a medium or a buffer. This enables the preparation of a mixture of substances, for example a medium or a buffer, whereby the fluid from the container can be heated to about 37° C. by means of the temperature control. The cell culture or medium usually needs to be heated to 37° C. Heating is usually done in water baths, which takes about 15 to 30 minutes. Especially on weekends or when cell culture media have to be changed quickly, this time hinders considerably. Furthermore, water baths must be cleaned and ultrapure water must be used. With the aid of the temperature control, it is also possible to thaw frozen liquids, such as sera, and then dispense them using the stroke system. Thus, with the stroke system and the container connected or connectable to it, it is possible to work particularly efficiently when preparing a mixture of substances, for example a medium or a buffer. In the preparation of media and buffers, additives in a quantity of about 0.01 to 0.1 ml could preferably be dosed by means of the stroke system. However, other dosing quantities or stroke settings are also conceivable. It is conceivable that a discrete or predefined fluid quantity, for example 0.1 ml, can be dosed by means of a stroke. However, pistons can also be provided, which are designed, for example, to dispense a smaller fluid quantity of 0.01 ml. In this case, ten strokes are necessary to dispense a discrete or predefined fluid quantity of 0.1 ml. The second stroke system described later, which can comprise a pipette-like outlet or a pipette-like outlet opening, is particularly suitable for dispensing a smaller fluid quantity in the range of 0.01 ml to 0.1 ml.

The stroke system can be firmly connected to the container. In other words, the stroke system can be integrated into the container and offered or supplied integrated in this way. However, it is also conceivable, as previously described, that the stroke system and the container are two separate elements that can be combined or connected with each other so that dosing of fluid from the container can take place. By the stroke system preferably being connected or connectable to the outlet of the container, the fluid can be pumped from the container and precisely dosed by actuation of the stroke system. Preferably, the stroke system is connected or can be connected to a container or beaker, for example a baby bottle, or to a funnel, for example a coffee filter funnel, for example via a hose system. In this way, the correctly dosed fluid can be filled into the container or beaker.

Preferably, the container or beaker is arranged below the stroke system connectable or connected to the container in the direction of gravity. Preferably, the stroke system is arranged or positioned between the container or beaker and the container in the direction of gravity. By the direction of gravity is meant the direction of a straight line pointing towards the center of the earth. In this way, the fluid can be easily guided out of the container in the direction of the stroke system by gravity and pumped out of the container into the container or beaker, so that the fluid can be guided into the container or beaker in a particularly simple manner.

Preferably, the stroke system comprises at least one UV-C illuminant.

The UV-C illuminant can be, for example, a UV-C tube or a UV-C lamp, which emit ultraviolet radiation in the UV-C range with a wavelength between 280 nm and 100 nm. The UV-C illuminant may be connected or connectable to the stroke system. The UV-C illuminant may be arranged adjoining or adjacent to the stroke system, in particular adjoining or adjacent to its outlet and/or to its piston. The UV-C illuminant thus enables sterilization and disinfection of the outlet and/or the piston. It is also conceivable that the UV-C illuminant or another UV-C illuminant is arranged adjoining or adjacent to further components of the stroke system so that these components can be reliably sterilized.

Preferably, all components of the stroke system are designed as disposable articles.

In particular, the container with a fluid may be designed as a disposable article. If fluid-carrying hoses or lines are provided, all fluid-carrying hoses or lines, for example hoses or lines by means of which the fluid is pumped out of the container, can be designed as disposable articles and thus be replaceable. This is particularly advantageous because the fluid-carrying lines can become germy and calcified. Even regular cleaning cannot prevent this, so completely replaceable components that are in fluid contact are advantageous. Ideally, a "single batch" process can be used, i.e., after the fluid in the container is used up, the entire container is replaced or discarded. This eliminates the need for cleaning and/or descaling with chemicals, which is particularly environmentally friendly and advantageous when preparing baby food and coffee. On the one hand, there is no harmful contamination of the fluid with chemicals, and on the other hand there are no changes in taste. In the case of media and buffer preparation, downtimes due to additional cleaning of the components are also avoided. This enables particularly efficient work.

The container can be supplied prefilled with a fluid, for example water. The container can be firmly connected to the piston pump and/or to the turntable. However, it is also conceivable that the container is detachably connected to the piston pump and/or the turntable. In this case, the container can be designed in such a way that it cannot be opened by the user and thus cannot be refilled. Alternatively, however, the container can also be designed as a reusable article. The container may then have a second opening with a closure element, for example a lid or a zipper, for example on a side of the container opposite to the first opening, so that the fluid inside the container can be refilled through the second opening. It is also conceivable that the container can be refilled with fluid through the first opening, which is connectable to the piston pump. In this case, the piston pump must be temporarily disconnected or removed from the first opening so that the fluid can be refilled through the first opening.

Preferably, the second container opening includes a tamper-evident element in addition to the closure element.

The tamper protection element may be connected to the closure element and/or the opening. The tamper protection element may be a seal and comprise a seal tape connected to the closure element in such a way that it is not possible to forcibly open or manipulate the seal without leaving clear traces. The tamper-evident element can be, for example, a seal or a sealing sticker or sealing sticker that is stuck onto the opening and thus seals it. It is also conceivable that the tamper protection element is integrally connected to the closure element. In the case of a screw cap, the closure element may include a tamper-evident ring that detaches from the screw cap when the screw cap is opened for the first time. The tamper-evident element thus provides protection against unauthorized opening of the container. This means that no one can open the container unnoticed, for example in the store, and fill it with something that could cause damage.

Preferably, the temperature control comprises a heating device, in particular a heating plate, wherein the heating device is arranged at least partially in contact with the container, wherein, preferably, the heating device at least partially adjoins or contacts a housing of the container.

The heating device can be designed as a heating plate or as a heating mat or as a metal plate and can comprise integrated or adjacent heating elements. The heating plate should be arranged in relation to the container in such a way that the container is as close as possible to the heating plate. This enables heat to be transferred from the heating plate to the container, in particular to one of the outer sides or to the housing of the container, so that the fluid inside the container can be reliably heated. However, it is also conceivable that the temperature control comprises a cooling device, in particular a cooling plate, wherein the cooling device is arranged at least partially in contact with the connected container, wherein, preferably, the cooling device at least partially adjoins or rests against the housing of the container. The cooling device may be designed as a cooling plate or as a cooling mat or as a metal plate and may comprise integrated or contacting cooling elements. This enables cooling of one of the outer sides of the housing of the container, so that the fluid inside the container can be reliably cooled. Particularly preferably, the temperature control comprises both a heating plate and a cooling plate. Alternatively, the temperature control may comprise a temperature control plate which can both heat and cool. The heating device and/or cooling device and/or the heating plate and/or cooling plate may be an integral part of the housing of the container. However, it is also conceivable that the heating device and/or cooling device and/or the heating plate and/or cooling plate are arranged within the housing.

Thus, it is possible that, depending on the type of use or application of the stroke system, the fluid inside the container can first be heated and then cooled. Preferably, the heating plate is designed to heat the fluid to a temperature of at least 100° C. or to the boiling temperature. In the case of dosing and/or preparation of baby food, this enables sterilization of the fluid inside the container so that germs and bacteria are reliably killed and the fluid is suitable for preparation of baby food. By means of the cooling plate, the fluid can then be cooled to a consumption temperature of 37° C. In the case of dosing and/or preparation of coffee, the heating plate further enables the fluid to be heated to a temperature between 90° C. and 100° C., particularly preferably about 96° C., suitable for the preparation of coffee. In the case of use of the stroke system in the preparation of media and buffer, the contents of the bag can be heated or defrosted by means of the heating plate. If the stroke system is used in a device for dosing and preparing coffee, the fluid inside the container can be cooled or chilled to a temperature that is advantageous for special coffee preparation methods, for example in cold brew preparation.

Preferably, the heating plate and/or the cooling plate and/or the temperature control plate for heating and cooling is in contact with the body of the container in the lower area thereof in the direction of gravity. This arrangement of the heating plate enables the fluid in the lower area of the interior of the container to be heated, so that a circulation movement of the fluid in the interior of the container is initiated and the fluid in the interior of the container can be heated uniformly. By arranging the cooling plate, the lower area inside the container can be cooled so that the circulation movement of the fluid inside the container can be stopped and the fluid inside can be cooled. Particularly preferably, the heating plate and/or the cooling plate are in contact with the body of the container in the adjacent area between the lower and upper areas along the longitudinal axis of the container. Conceivably, in the case where the temperature control comprises both a heating plate and a cooling plate, the heating plate and the cooling plate at least partially contact or contact the housing of the container on respective opposite sides thereof. This enables particularly efficient heating and/or cooling of the fluid inside the container.

Preferably, the heating plate and/or the cooling plate are designed to be connected or connectable to a device for dosing and preparing baby food or coffee or to a device for preparing a mixture of substances, for example a medium or a buffer. It is conceivable that the heating plate and/or the cooling plate can be arranged in an inclined position in one of the previously described devices, for example on an inclined side wall. This allows the container to rest particularly close to the heating plate and/or the cooling plate, which enables particularly efficient heating and/or cooling. However, this effect can also be achieved by alternatively or additionally limiting the area in one of the devices described above to such a narrow extent that the container must necessarily rest against the heating plate and/or the cooling plate. It is also conceivable that the heating device and/or cooling device or the heating plate and/or cooling plate surround the container at least partially, preferably completely. Thus, the container may be completely surrounded by the heating device and/or cooling device and/or the heating plate and/or cooling plate, wherein the heating device and/or cooling device and/or the heating plate and/or cooling plate may contact the container or be arranged adjacent or neighboring thereto. An inclined or sloped position of the heating plate and/or cooling plate is further advantageous for constructing a system in which the container with stroke system and temperature control is to be used. For example, wall cabinets often limit the height of a system, such as in a coffee or baby food preparation device placed on a kitchen counter. With an inclined or sloped heating plate and/or cooling plate, a larger container can be used, which also rests against the heating plate and/or cooling plate in an inclined or sloped manner, if the vertical distance, for example between the kitchen counter and the wall cabinet placed above it, does not allow the container to be aligned vertically. Furthermore, an inclined heating plate and/or cooling plate and thus an inclined position of the container allows filling into a collecting container, for example a baby bottle, which comprises an opening with a limited or small diameter.

Preferably, the heating plate comprises at least two heating zones, preferably three heating zones.

The heating zones can be designed as heating rods which extend at least partially between two opposite sides or side edges of the heating plate. Preferably, the heating rods extend in the direction of the longitudinal axis of the heating plate at least partially between the opposite sides, and further preferably the heating rods extend over the entire area between the opposite sides. Alternatively, the heating rods may extend substantially transverse to the direction of the longitudinal heating plate axis at least partially between opposite sides. Preferably, the heating rods extend across the entire area between two opposite sides transverse to the longitudinal axis of the heating plate. Thus, a lower heating zone, a middle heating zone and an upper heating zone may be provided in the direction of gravity. The heating rods may be arranged on an outer side of the heating plate which is opposite to the outer side of the heating plate against which the container for the fluid rests against or adjoins. It is also conceivable that the heating rods are integral with the heating plate and extend through the interior of the heating plate. The heating rods may be integrally formed with the heating plate. However, it is also conceivable that the heating rods are connectable or connected to the heating plate. For example, they may be bonded to an external surface of the heating plate. The different heating zones prevent the container from melting at very high temperatures at those points where the container has no fluid inside. This is particularly advantageous when the container empties and the fluid as a heat-conducting medium is no longer uniformly present in the container.

Preferably, the at least two heating zones, preferably three heating zones, can be controlled or regulated. Preferably, the heating zones or the heating elements can be controlled or regulated individually.

The fact that the heating zones can be controlled individually means that, for example, only the middle heating zone and/or the lower heating zone can be controlled when the fluid in the container has already been partially emptied. In this way, the upper area of the container, which no longer contains any fluid, would not be tempered, and melting of the container or its housing is prevented. As an alternative to the heating zones or heating rods, a container material could be used which is extremely heat-resistant.

Preferably, the container comprises a flexible material or is formed from a flexible material. Preferably, the container comprises an aluminium composite foil or is formed from an aluminium composite foil.

The flexible material allows the container to lie particularly close to the heating plate and/or cooling plate, especially when it is inserted or arranged in one of the devices described above. This enables particularly efficient heating and/or cooling. The use of an aluminium composite foil provides an impermeable barrier to air and light, thus ensuring reliable protection of the fluid inside the container from external influences. The metal particles or the metal content also enables particularly good heat conduction between the heating plate and/or cooling plate and the fluid inside the container.

Preferably, the container and/or the stroke system, in particular the piston pump, are made of a bioplastic or bioplastic or a bio-based plastic. The container and/or the stroke system can thus comprise a plastic or be formed from a plastic that is produced on the basis of renewable raw materials. This is advantageous because the container and the stroke system are thus biodegradable and compostable, which is particularly environmentally friendly. For example, the container may comprise a film made from stone paper. Stone paper is a substrate made from about 80 wt.-% (about 60 vol.-%) calcium carbonate (limestone) and about 20 wt.-% (about 40 vol.-%) polyethylene resin (HDPE) as a binder. Weight percent stands for weight percent and vol percent stands for volume percent. The use of stone paper is advantageous because stone paper has food approval, is water resistant, and is heat resistant up to about 100 degrees Celsius. Furthermore, stone paper does not use wood and stone paper can be easily recognized and recycled by recycling plants. Only limestone remains in the process, and limestone composts well.

Conceivably, the container is at least partially made of bioplastic or bioplastic or a bio-based plastic and at least partially comprises an aluminium composite film. Preferably, the aluminium composite foil is in contact with the temperature control. This enables particularly good heat conduction between the heating plate and/or cooling plate and the fluid inside the container.

Preferably, the container comprises a dimensionally stable material or is formed from a dimensionally stable material. Preferably, the material of the container comprises metal particles.

Instead of the flexible material, the container may also comprise a non-flexible material and be designed, for example, as a dimensionally stable container. This may comprise a housing which is relatively thin or which has a thickness such that the transfer of heat between the heating plate and/or cooling plate and the interior of the container is enabled. Also, the dimensionally stable container may comprise metal particles such that improved thermal conductivity is enabled. Conceivably, the container may also comprise a combination of a flexible and non-flexible material.

Preferably, the temperature control has a fixing element, wherein the temperature control can be fixed or connected to the container by means of the fixing element, wherein, preferably, the fixing element has at least one magnet.

The temperature control can be connected or attached to the container by means of a fixing element. It is conceivable that the container also has a fixing element. In this way, the container and the temperature control or the heating plate and/or the cooling plate can be connected to each other in a simple manner by means of the two fixing elements. It is conceivable that the fixing elements are each designed as magnets, so that the temperature control or the heating plate and/or the cooling plate can be connected to the container by magnetic action. Alternatively, the fixing elements could also be designed as click elements or as clamping elements or as latching elements, so that the temperature control or the heating plate and/or the cooling plate are clicked or clamped or latched together with the container. These fixing elements enable the temperature control to be connected to the container particularly easily and quickly, so that the container can be replaced easily and quickly.

Preferably, the temperature control is controllable or adjustable.

So that the temperature control or the heating plate can be used to set or control different temperatures for the various applications described above, the stroke system or the temperature control can also comprise a control and regulation device for controlling or regulating the temperature of the heating plate and/or the cooling plate. It is conceivable that the control or regulation device can be coupled with an application software, for example an app, so that the temperature of the temperature control can be controlled or regulated, for example, from a smartphone via the app.

Preferably, the temperature control is arranged in a plane that extends essentially transverse to the direction of gravity.

The temperature control can, for example, be arranged in one of the previously described devices for dosing and preparing baby food or coffee or for preparing a mixture of substances, for example a medium or a buffer, in a plane that is oriented essentially transverse to the direction of gravity. The temperature control may thus be mounted at an angle or incline, for example at an angle to an upper and lower boundary of a previously described device. Thus, the container for a fluid may be arranged adjoining or adjacent, in particular contacting, the temperature control. The container may thus be arranged in a plane substantially parallel to the plane of the temperature control. Due to the inclined or inclined mounting of the container, the fluid inside the container can exit almost completely from its outlet. At the same time, the inclined mounting of the temperature control allows the fluid inside the container to be tempered to a suitable temperature. The inclination serves to improve contact between the container and the temperature control or heating plate and/or cooling plate. This enables better and faster heating. Furthermore, the inclined position makes it particularly easy to fill the fluid inside the container into a container, for example a baby bottle, a coffee cup or can, or into a preparation device of an apparatus for preparing a mixture of substances, which has only a small or limited opening for filling the fluid.

An inclined or sloped position of the temperature control, for example the heating plate and/or cooling pad, is further advantageous for the design of a system in which the container with stroke system and temperature control is to be used. For example, wall cabinets often limit the height of a system, for example in a coffee or baby food preparation device placed on a kitchen counter. With an inclined or sloped heating plate and/or cooling plate, a larger container can be used, which also rests against the heating plate and/or cooling plate in an inclined or sloped manner, if the vertical distance, for example between the kitchen counter and the wall cabinet placed above it, does not allow the container to be aligned vertically. Furthermore, an inclined heating plate and/or cooling plate and thus an inclined position of the container allows filling into a collecting container, for example a baby bottle, which comprises an opening with a limited or small diameter.

Preferably, the container or stroke system includes at least one sensor.

The level of the fluid in the container can be determined by means of a sensor. The sensor may be arranged adjoining or adjacent to the container. For example, the sensor can be a scale that is arranged with the container in such a way, for example below the container, that the weight of the container and/or the weight or change in weight of the fluid inside the container can be determined. Thus, the level of the fluid in the container can be determined and displayed at any time so that the fluid can be refilled or the empty container can be replaced or exchanged. The scale can also be used alternatively, for example for readjusting fluid, as described later in connection with the second, further stroke system. Particularly preferably, the scale is placed for this purpose in the direction of gravity below a collection container, for example below a baby bottle, a coffee cup or jug or coffee filter holder, or below a preparation device, for example below a preparation device for mixtures of substances. The sensor or scale may be connected to a clamping element, for example a clamp or lifting clamp or lifting clip. The sensor or scale may therefore be placed at the same level as the container or above the container. The clamp may be arranged on one of the side walls of a device, for example a device for preparing a mixture of substances, for example a medium or a buffer. Preferably, the clamp is connected to this device in such a way that it is displaceable in the direction of gravity. Thus, it is possible to arrange or place the container in or on or on the clamp or lifting clamp, so that the position of the container can be changed in the direction of gravity. At the same time, the weight of the fluid inside the container can be determined by means of the sensor or scale.

The sensor or the scale can be connected to an application software, for example a mobile app, in such a way that the filling level of the fluid can be automatically indicated, for example by a signal tone or a signal light, so that a new fluid or a new container with fluid can be provided. It is also conceivable to automatically order a new fluid or a new container with fluids, which will be described in the next section.

It is also conceivable that the level of the fluid is determined using the initial volume or weight of the fluid, which corresponds, for example, to the volume or weight of the commercial fluid container that has not yet been opened (and contains fluid). The data on the volume or weight of the commercial fluid container that has not yet been opened (and contains fluid) can, for example, be stored in a database or in an app, with the data being made accessible. By means of a processor, based on the initial volume or weight of the container for a fluid and the number of doses, the consumption of the fluid can be determined or calculated. The processor can be part of a device, for example a device for dosing and preparing baby food and/or coffee or a device for preparing a mixture of substances, for example a medium or a buffer. Based on these determined or calculated values, fluid can be reordered automatically, for example on the Internet. For this purpose, a memory unit can be provided in which the usage frequencies are stored. This enables an order to be triggered taking into account the delivery times and/or the consumption quantities and/or the safety stock of containers not yet used and/or the expiry date of the fluid inside the container. In this way, the user no longer needs to pay attention to how much fluid is still available. This is automatically reordered and delivered without the user having to specifically place an order and without the user having to purchase the fluid from a retailer. The containers that arrive can first be scanned, whereby a stock of containers can be determined or registered. In this way, a safety stock or stock of containers can be automatically taken into account when new orders are placed. As an alternative to automated ordering, it is also conceivable that the user receives an indication, for example by means of a signal tone or a message, for example on the screen of a computer or smart device, that the stock of containers with fluid has fallen below a certain minimum number or a certain safety stock level, so that the user can place the reorder manually.

Preferably, the piston pump comprises a turntable. Preferably, the turntable is designed as an eccentric or is mounted eccentrically.

The turntable can be designed as an eccentric or as a control disk, which is mounted on a shaft and whose center lies outside the shaft axis. Preferably, the piston is arranged below the eccentric in the direction of gravity and outside, preferably above or below in the direction of gravity, the shaft axis. In this way, the rotational movement of the eccentric can be converted into the translational movement of the piston or into the piston stroke in an advantageous manner, so that dosing is possible.

Preferably, the stroke system comprises a motor, wherein the turntable is connected or can be connected to the motor. Preferably, the turntable is arranged above the piston in the direction of gravity.

The motor can drive the turntable automatically and set it in rotary motion. The turntable can be arranged above the piston in the direction of gravity. However, it is also conceivable that the turntable is arranged below the piston in the direction of gravity. The rotational movement causes the piston to move in translation. In this way, the piston can be pressed downward in the direction of the container in the direction of gravity, so that the fluid can be pumped out of the container and dosed correctly. Thus, the fluid can be pumped from the container and properly dosed by the displacement or movement of the piston. One revolution of the motor can result in multiple stroke movements. In other words, one revolution of the motor can result in multiple combined rotational and translational movements of the turntable and piston.

Preferably, the motor is designed as a reusable component. In particular, if the stroke system comprises replaceable components or disposable items, the motor should be detachably connected or connectable to them. For example, the motor may be connectable to a replaceable swivel plate so that the motor can be reused and the swivel plate can be replaced. However, it is also conceivable that the turntable can be reused with the motor.

It is conceivable that the stroke system described above can be accommodated in a stroke system accommodating area in one of the devices described above for dosing and preparing baby food or coffee or for preparing a mixture of substances, for example a medium or a buffer. The stroke system receiving area may be designed to receive the stroke system with the motor and/or the turntable and/or the piston pump. It is conceivable that the motor and/or the turntable are fixedly connected to the stroke system receiving area. These can be arranged, for example, on a wall, for example the rear wall, of the stroke system receiving area and/or on its side walls. The container can be inserted and inserted into the stroke system receiving area in such a way that the turntable and/or the piston in the stroke system receiving area can interact or interact with the container. The piston pump may be clickable into the housing in the direction of gravity above the pivot plate. The motor may be designed to rotate the pivot plate in a specific direction or position. Such a click geometry advantageously results in a positive connection between the turntable and the piston pump. A plate can be provided on the container for the fluid. This can serve as a guide means for clicking in the piston pump. Furthermore, the plate can serve to click the container into the housing of a previously described device or to connect it to it. Thus, by means of the turntable and the piston, the fluid can be pumped from the container and dosed correctly. It is also conceivable that the piston pump and motor and/or the turntable and/or the piston are fixedly connected to the container, and are replaceable together with the container. In this way, the motor and/or the turntable and/or the piston can be inserted together with the container into the stroke system receiving area so that the fluid can be pumped and dosed from the container.

It is conceivable that the piston pump can be inserted or clicked into the housing or into the stroke system receiving area within the housing of one of the previously described devices for dosing and preparing baby food or coffee or for preparing a mixture of substances, for example a medium or a buffer. The plunger can be arranged above or below the turntable in the direction of gravity. This arrangement, and the fact that the piston pump can be clicked into the housing or into the stroke system receiving area, advantageously results in a positive connection between the turntable and the piston pump. The motor can then rotate to a specific position. Guide means, for example a guide plate, can be arranged on the housing or in the stroke system receiving area, by means of which the piston pump can be inserted and/or clicked into the housing in a simple manner. Furthermore, a container for a fluid, as described below, can be clicked into the housing by means of the guide plate. The swivel plate may be designed as a replaceable part and thus be reusable. It can be arranged on the motor, preferably the turntable is connected to or attached to the motor.

In accordance with another aspect of the invention, there is provided a container for a fluid, the container comprising a housing with an interior space for holding fluid and an first opening with fluid connection to the interior, wherein the container is connected or can be connected to a stroke system, the stroke system comprising a piston pump having a piston such that a fluid can be dosed from the container by a displacement of the piston, and temperature control means for controlling the temperature of the fluid to be dosed by the stroke system, and wherein the container is designed such that the container can be coupled to the temperature control means of the stroke system.

The container may be designed to be connected or connectable to the previously described stroke system, and thus may have all the features and advantages thereof described in connection with the previously described container. In addition, the stroke system described below may also have all the features and advantages thereof described in connection with the previously described stroke system. The reciprocating pump may include a swivel plate adjacent the piston, the piston being deflectable by means of the swivel plate. The container may be couplable to or connectable to or connected to the temperature control and/or the heating plate and/or the cooling plate of the stroke system. Thus, the container may be arranged such that the container rests against the temperature control of the stroke system. Thus, the container for a fluid can be easily connected to and disconnected from the temperature control so that the container can be quickly replaced after the fluid has been used up.

Preferably, the stroke system is connected or can be connected to the first opening of the container.

The container may have an first opening, such as the outlet opening on the container, from which the fluid may be removed. The container may be fixedly connected or connectable to the stroke system and arranged such that the fluid may be pumped from within the container by means of the stroke system. For example, the stroke system may be connected or connectable to the first opening of the container. To this end, the stroke system may be fixedly or releasably connected to the first opening, for example by bonding or screwing, so that the interior of the container is with fluid connection to the stroke system, for example via hoses or other fluid-carrying conduits. Thus, the fluid can be pumped and dosed from the inside of the container in a simple manner.

By the fact that the container is connected or can be connected to the stroke system, the container and the stroke system to which the container is connected or can be connected to can also be used for various devices known from the prior art. These may be a device for dosing and preparing baby food, a device for dosing and preparing coffee, or a device for preparing a mixture of substances, for example a medium or a buffer, as previously described. Each of these devices provide for housing a container for a fluid, the fluid inside the container being to be temperature controlled by means of a temperature control.

Preferably, the housing of the container has an contact surface designed such that the container is at least partially in contact with the temperature control of the stroke system, wherein, preferably, the temperature control at least partially adjoins or rests against the contact surface, wherein, preferably, the temperature control comprises a heating plate.

The contact surface may be an external surface of the housing and may extend at least partially along the longitudinal axis of the container between a lower area or lower end of the container and an upper area or upper end of the container (as viewed in the direction of gravity). Preferably, the contact surface extends between the lower area or lower end of the container and the upper area or upper end of the container along the entire longitudinal axis of the container. The contact surface may extend in a area adjacent or contiguous to the longitudinal axis of the container and may be spaced at opposite ends of the container, as viewed in a plane transverse to the longitudinal axis of the container. In other words, the container may bear against the temperature control such that opposite ends of the container are not in at least partial contact with the temperature control but are spaced from the temperature control.

The temperature control can comprise a heating plate, which can be designed as a heating mat or as a metal plate and can comprise integrated or adjacent heating elements. The heating plate should be arranged in relation to the container in such a way that the contact surface of the container is as close as possible to the heating plate. This enables heat to be transferred from the heating plate to the container, in particular to one of the outer sides or to the housing of the container in the area of the contact surface, so that the fluid inside the container can be reliably heated. However, it is also conceivable that the temperature control comprises a cooling plate, wherein the cooling plate is arranged at least partially in contact with the connected container, wherein, preferably, the cooling plate at least partially adjoins or rests against a housing of the container, preferably the contact surface. The cooling plate may be designed as a cooling mat or as a metal plate and may comprise integrated or contacting cooling elements. This enables cooling of one of the outer sides or the housing of the container in the area of the contact surface, so that the fluid inside the container can be reliably cooled. Particularly preferably, the temperature control comprises both a heating plate and a cooling plate and two contact surfaces such that the heating plate and the cooling plate are each at least partially in contact with one of the contact surfaces. The contact surfaces are preferably arranged on opposite sides of the housing of the container, for example on opposite sides as viewed in a plane transverse to the longitudinal axis of the container.

Thus, it is possible that, depending on the type of use or application of the container, the fluid inside the container can first be heated and then cooled. Preferably, the heating plate is designed to heat the fluid to a temperature of at least 100° C. or to the boiling temperature. In the case of dosing and/or preparation of baby food, this enables sterilization of the fluid inside the container so that germs and bacteria are reliably killed and the fluid is suitable for preparation of baby food. By means of the cooling plate, the fluid can then be cooled to a consumption temperature of 37° C. In the case of dosing and/or preparation of coffee, the heating plate further enables the fluid inside the container to be heated to a temperature between 90° C. and 100° C., particularly preferably about 96° C., suitable for the preparation of coffee. In the case where the container is used in the preparation of media and buffer, the contents of the bag can be heated or defrosted by means of the heating plate. If the container is used in a device for dosing and preparing coffee, the fluid inside the container can be cooled or chilled to a temperature that is advantageous for special coffee preparation methods, for example in cold brew preparation.

Preferably, the contact surface is in contact with the heating plate and/or the cooling plate at least in the lower area of the container. This allows the fluid inside the container to be heated in its lower area, so that a circulation movement of the fluid inside the container is set in motion and the fluid inside the container can be heated uniformly. By arranging the cooling plate, the lower area inside the container can be cooled so that the circulation movement of the fluid inside the container can be stopped and the fluid inside the container can be cooled.

Preferably, the container is designed so that the temperature control can be fixed or connected to the container by means of a fixing element, wherein, preferably, the fixing element is a magnet.

The container can be connected to the temperature control by means of a fixing element. It is conceivable that the container and the temperature control each have a fixing element. In this way, the container and the temperature control or the heating plate and/or the cooling plate can be connected to each other in a simple manner by means of the two fixing elements. It is conceivable that the fixing elements are each designed as magnets, so that the temperature control or the heating plate and/or the cooling plate can be connected to the container by magnetic action. Alternatively, the fixing elements could also be designed as click elements or as clamping elements or as latching elements, so that the temperature control or the heating plate and/or the cooling plate are clicked or clamped or latched together with the container. Alternatively, the temperature control or the heating plate and/or the cooling plate can be connected to the container by means of Velcro fastening elements or adhesive elements. These fixing elements enable the temperature control to be connected to the container particularly easily and quickly, so that the container can be replaced easily and quickly.

Preferably, the container or housing of the container comprises a flexible material or is formed from a flexible material, wherein, preferably, the container or housing of the container comprises an aluminium composite foil or is formed from an aluminium composite foil.

Due to the flexible material, the container or the housing of the container can lie particularly close to the heating plate and/or cooling plate, preferably in the area of the contact surface, especially when it is inserted or arranged in one of the devices described above. This enables particularly efficient heating and/or cooling. The use of an aluminium composite foil enables an impermeable barrier to air and light, thus ensuring reliable protection of the fluid inside the container from external influences. The metal particles or the metal content also enables particularly good heat conduction between the heating plate and/or cooling plate and the fluid inside the container.

Preferably, the container or the housing of the container comprises a dimensionally stable material or is formed from a dimensionally stable material.

Instead of the flexible material, the container or the housing of the container can also comprise a non-flexible material and be designed, for example, as a dimensionally stable container or container. This may comprise a housing that is relatively thin or that has a thickness such that it allows the transfer of heat between the heating plate and/or cooling plate and the interior of the container. Also, the dimensionally stable container may comprise metal particles such that improved thermal conductivity is enabled between the temperature control and/or heating plate and/or cooling plate and the interior of the container. Also conceivable is an embodiment in which the container comprises both a dimensionally stable material and a flexible material, or in which the container is formed from both a dimensionally stable material and a flexible material. The container can thus be formed from a combination of different materials.

Preferably, the container comprises a second opening, wherein, preferably, the container comprises a lid for covering the second opening.

The second opening may be disposed opposite the first opening in the direction of the longitudinal axis of the container. For example, the first opening may be located in the lower area or adjoining or adjacent to the lower end of the container, and the second opening may be located in the upper area or adjoining or adjacent to the upper end of the container. This arrangement of the second opening allows fluid to be replenished to the interior of the container in a particularly simple manner, even when connected to the stroke system. This is particularly advantageous when the container is reused and not replaced. The container may further comprise a closure element. The closure element can be a lid for covering the second opening, with which the second opening can be closed again after the fluid has been filled in, so that the fluid inside is protected from external influences. It is also conceivable that the closure element is a zipper or a zipper with which the second opening can be closed again after the fluid has been filled in.

Preferably, the temperature control may be arranged in a plane that extends essentially transverse to the direction of gravity, with the container at least partially contacting the temperature control.

The temperature control can be arranged, for example, in one of the previously described devices for dosing and preparing baby food or coffee or for preparing a mixture of substances, for example a medium or a buffer, in a plane that is oriented essentially transverse to the direction of gravity. The temperature control may thus be mounted at an angle, for example at an angle to an upper and lower boundary of a previously described device. The container for a fluid may be arranged adjoining or adjacent to, in particular adjacent, to a side of the temperature control. The container may thus be arranged in a plane substantially parallel to the plane of the temperature control. Due to the inclined or inclined mounting of the container, the fluid inside the container can exit almost completely from its outlet. At the same time, the inclined mounting of the temperature control allows the fluid inside the container to be tempered to the appropriate or intended temperature.

An inclined or sloped position of the temperature control, in particular the heating plate and/or cooling pad, is further advantageous for the design of a system in which the container with stroke system and temperature control is to be used. For example, wall cabinets often limit the height of a system, such as in a coffee or baby food preparation device placed on a kitchen counter. With an inclined or sloped heating plate and/or cooling plate, a larger container can be used, which also rests against the heating plate and/or cooling plate in an inclined or sloped manner, if the vertical distance, for example between the kitchen counter and the wall cabinet placed above it, does not allow the container to be aligned vertically. Furthermore, an inclined heating plate and/or cooling plate and thus an inclined position of the container allows filling into a collecting container, for example a baby bottle, which comprises an opening with a limited or small diameter.

Preferably, the stroke system further comprises at least one sensor for determining or detecting the level of the fluid in the interior of the container.

The level of the fluid inside or in the interior of the container can be determined or detected by means of the sensor. The sensor may be arranged adjoining or adjacent to the container. For example, the sensor may be a scale arranged with the container in such a way, for example below the container (as seen in the direction of gravity), that the weight of the container and/or the fluid inside the container can be determined. Thus, the level of the container can be determined and displayed at any time so that the fluid can be refilled or the empty container can be replaced or exchanged. The scale can also be used alternatively, for example for readjusting fluid, as described later in connection with the second, further stroke system. Particularly preferably, the scale is placed for this purpose in the direction of gravity below a collecting container, for example below a baby bottle, a coffee cup or jug or a coffee filter holder, or below a preparation device of an apparatus for preparing a mixture of substances. The sensor can be connected to an application software, for example a mobile app, in such a way that the level of the fluid can be indicated automatically, for example by a signal tone or a signal light, so that a new fluid or a new container with fluid can be provided.

It is also conceivable that the level of the fluid is determined using the initial volume or weight of the fluid, which corresponds, for example, to the volume or weight of the commercial fluid container that has not yet been opened (and contains fluid). The data on the volume or weight of the commercial fluid container that has not yet been opened (and contains fluid) can, for example, be stored in and taken from a database or an app. By means of a processor, based on the initial volume or weight of the container for a fluid and the number of doses, the consumption of the fluid can then be determined or calculated. The processor can be part of a device, for example a device for dosing and preparing baby food and/or coffee or a device for preparing a mixture of substances, for example a medium or a buffer. Based on these determined or calculated values, fluid can be reordered automatically, for example on the Internet. For this purpose, a memory unit can be provided in which the usage frequencies are stored. This enables an order to be triggered, taking into account the delivery times and/or the consumption quantities and/or the safety stock of containers not yet used and/or the expiry date of the fluid inside the container. In this way, the user no longer needs to pay attention to how much fluid is still available. This is automatically supplied without the user having to specifically place an order and without the user having to purchase the fluid from a retailer. The containers that arrive can first be scanned, whereby a stock of containers can be determined or registered. In this way, a safety stock or stock of containers can be automatically taken into account when new orders are placed. As an alternative to automated ordering, it is also conceivable that the user receives an indication, for example by means of a signal tone or a message, for example on the screen of a computer or on the screen of a smart device or in an app, that the stock of containers with fluid has fallen below a certain minimum number or a certain safety stock, so that the user can place the reorder manually.

Preferably, the container is connected or can be connected to at least one further stroke system.

Thus, in addition to a first stroke system, the container may include a further, second stroke system. The further, second stroke system can have all the previously described features of the first stroke system and their advantages. The container may comprise, in addition to the first opening, a further opening in the lower area or at the lower end (as viewed in the direction of gravity), such that the further stroke system is connected or can be connected to the further opening. This connection can be made in a manner analogous to the connection between the previously described stroke system and the first opening. By the fact that the container can be connected to two stroke systems, for example, different dosing quantities or lifting volumes can be made possible with the two stroke systems. For example, one stroke system can be used to dispense a larger amount of fluid and the other of the stroke systems can be used to dispense a smaller amount of fluid. Thus, the stroke system that can dispense a smaller amount of fluid can provide more accurate dispensing, whereas the stroke system that can dispense a larger amount of fluid can provide faster dispensing. The container or bag can comprise several chambers. The chambers may each be connected or connectable to a stroke system. However, it is also conceivable that the container or bag comprises a first chamber which is connected or can be connected to two stroke systems, and comprises a further, second chamber which is connected or can be connected to a further stroke system. Other combinations between the chambers and the stroke systems are conceivable.

Preferably, the at least one further stroke system has at least one sensor for determining or detecting the level of the fluid in the interior of the container.

The second, further stroke system can comprise a sensor that can be designed similarly to the sensor of the (first) stroke system. Thus, the level of the fluid inside or in the interior of the container can also be determined or ascertained by means of the sensor of the further stroke system. The sensor can therefore be arranged adjoining or adjacent to the container. For example, the sensor may be a scale arranged adjoining or adjacent to the container, for example below the container (as seen in the direction of gravity), so that the weight of the container and/or the fluid inside the container can be determined. It is also conceivable to arrange the scale below the collection container, for example below a baby bottle, a coffee cup or jug, or on the coffee filter holder. Thus, the fill level of the container can be determined and displayed at any time by means of the sensor or the scale of the second, further stroke system, so that the fluid can be refilled or the empty container can be replaced or exchanged. This is advantageous, because after the fluid has been dosed by means of the sensor or the scale of the first stroke system, the scale of the second, further stroke system can be used for readjustment. Compensation of the dosing inaccuracy of screws is also made possible. The sensor or the scale of the second or further stroke system can be connected to an application software, for example a mobile app, in such a way that the filling level of the fluid can be indicated automatically, for example by a signal tone or by a signal light, so that a new fluid or a new container with fluid can be provided.

Dosing accuracy plays a major role in various devices, especially in the previously described device for preparing a mixture of substances, for example a medium or a buffer, in which a fluid and a powder are mixed together. Here, very precise dosing is required. As a rule, the powder must be dosed with a deviation of 0.5%. If the powder is conveyed and dosed by means of a screw conveyor, it may not be possible to meter the powder so precisely. This is due to the fact that the powder usually empties immediately when a screw chamber or screw housing, in which the conveying screw is located, is opened. Furthermore, very small screw geometries in particular cannot convey the powder in a process-safe manner, so that clumping can occur. A total volume deviation of about 5 percent is usually acceptable to the user. Usually, fluid or water is first filled into a hopper, then powder, whose weight is determined by a sensor, for example a scale, and finally fluid or water again, in order to compensate for the inaccuracy in the powder dosing. Alternatively, however, a fine adjustment can also be made with the second, further stroke system, so that the inaccuracy in the powder dosing can be compensated. By having the container connected or connectable to a first stroke system for dosing a larger amount of fluid and a second stroke system for dosing a smaller amount of fluid, work can be done quickly and yet precisely. If the container were only connected or connectable to a stroke system for dosing a smaller quantity of fluid, readjustments could be made, but the entire dosing process would take a very long time.

The second, further stroke system can also be used to compensate for a dosing inaccuracy that occurs during the dosing of the fluid, for example if a clamp system is used instead of a first stroke system to dose the fluid. A clamp system comprising one or more clamp elements with which the fluid is to be dosed can also have dosing inaccuracies which can be compensated for by means of the second stroke system described above for dosing a smaller quantity of fluid.

Preferably, each of the stroke systems comprises an outlet having an outlet opening through which the fluid can exit the interior of the container, the outlet of at least one of the stroke systems having a cross-section transverse to its longitudinal outlet axis which tapers toward the outlet opening.

In other words, at least one of the stroke systems includes a pipette-like outlet. The outlet of either stroke system may extend along a longitudinal outlet axis between a first end and a second end. The outlet may extend in a substantially tubular manner along the longitudinal outlet axis. Further, the outlet may have a substantially equal cross-section (as viewed transverse to the longitudinal outlet axis) between the first end and the second end. Fluid may be pumped from within the container to the outlet by the piston pump and may enter the outlet at the first end and exit the outlet opening at the second end and be filled into a collection container, for example. The outlet opening may thus be arranged at the second end.

In at least one of the stroke systems, for example in the second, further stroke system, the outlet may be pipette-shaped. In this case, the outlet may have a first outlet portion extending between the first end and the second end as previously described. Adjoining or adjacent to the second end, the outlet may have a second outlet section that also extends along the longitudinal outlet axis between the second end and a third end. The third end is spaced further from the first end than the second end. The outlet may have a cross-section in the second outlet portion that tapers toward the third end. The outlet opening may then be located at the third end, and may have a cross-sectional area (as viewed transversely to the longitudinal outlet axis) adjoining or adjacent to the third end that is smaller than the cross-sectional area of the outlet at any location in the first outlet section. The first outlet portion and the second outlet portion may be integrally made or integrally joined together. However, it is also conceivable that the two outlet sections are manufactured as individual parts, and are connected to each other at the second end of the outlet, for example by fitting or gluing.

Due to the pipette-like outlet or the pipette-like outlet opening, the fluid inside the fluid can be readjusted in a particularly simple manner. For example, by means of the first stroke system, a larger amount of fluid can be dosed and a larger amount of fluid can be pumped out of the container first. By means of the second stroke system with the pipette-like outlet or the pipette-like outlet opening, a small amount of fluid can then be subsequently dosed so that a predetermined, exact amount of fluid can be dosed from the container. This is particularly advantageous because especially small amounts of fluid can be dosed. This plays a major role when dosing accuracy is particularly relevant, for example when preparing a mixture of substances, especially a medium or a buffer, where dosing inaccuracy can occur due to the dosing of a powder required for the medium or buffer.

It is also conceivable that several containers, for example two containers, are connected or connectable with a stroke system. Preferably, at least one of the containers comprises a temperature control with all the features described above, for example the design as a heating plate, and the advantages thereof. Further preferably, each of the containers comprises its own temperature control having all the previously described features. This allows the fluid inside the multiple containers to be tempered differently. Preferably, the stroke system is connected or can be connected to the outlet of each of the containers. This is advantageous, since a fluid inside each of the containers can thus be dosed by means of one and the same stroke system. Therefore, several containers with the same fluid may be provided, or several containers with a different fluid may be provided, which are connectable or connected to one and the same stroke system. Two or more containers are thus advantageous if two or more mixtures of substances have to be produced and thus two or more substances, for example powder with water and/or sodium bicarbonate, have to be mixed together.

Preferably, the stroke system is connected or can be connected to an analysis device or to an analysis system. The analysis system may comprise a measuring device, for example a scale, and/or a smart device and/or a smart watch. Preferably, the dosing of the fluid from one of the previously described containers is performed as a function of data determined or transmitted by the analysis system.

As previously described, the stroke system can be used in various devices, for example in the previously described device for preparing a mixture of substances, for example a medium or a buffer, in which a fluid and a powder are mixed together. The stroke system can be designed such that the powder dosing and/or the fluid dosing of the previously described device can be performed as a function of the data determined or transmitted by the measuring device, for example a scale, and/or by the smart device and/or by the smart watch. For example, it is conceivable that powder dosing and/or fluid dosing may be performed as a function of various user-based characteristics, such as the body mass index (BMI), weight, or blood oxygen of a subject. It is further conceivable that dosing may be performed as a function of an electrocardiogram (ECG), heart rate, heart rhythm, exercise activities, eating habits, and/or sleeping habits, such as length of sleep time, of a subject. These values can be obtained directly, such as via the smartwatch and transmitted to the hub system. However, the values, such as those based on an electrocardiogram, can also be stored in the smart watch and/or in the smart device, for example in an app, and transmitted to the stroke system automatically or on demand. In an advantageous manner, a user-based mixture of substances can thus be prepared, which is a suitable mixture of different substances, such as vitamins, magnesium, omega-3, turmeric, zinc, choline, chromium, copper, and/or selenium. These substances are mentioned only by way of example. Other substances are conceivable.

Preferably, the container is available pre-filled with a fluid and/or the container is disposable.

All the containers described above can be supplied by the manufacturer already filled with fluid. This means that a new container can easily be ordered after an existing container has been emptied by means of the stroke system and the fluid has been applied. Thus, the container is replaceable and can be easily separated from the stroke system. By replaceable is meant that the container can be designed as a disposable or single-use item. A container that has already been emptied can thus simply be replaced by the new container together with the fluid. The fact that the containers described above can be prefilled and/or designed as disposable or single-use articles and can thus be replaceable is particularly advantageous if a "single batch" process is used, i.e. after the fluid in the container is used up, the entire container is replaced or discarded. This eliminates the need for cleaning and descaling with chemicals, which is particularly advantageous when preparing baby food and coffee. On the one hand, there is no harmful contamination of the fluid with chemicals, and on the other hand, there are no changes in taste. In the case of media and buffer production, downtimes due to additional cleaning of the components are also avoided. This makes it possible to work particularly efficiently. However, it is also conceivable that the containers described above are designed as reusable containers, so that the fluid can simply be refilled after emptying or consumption.

Figure 2:
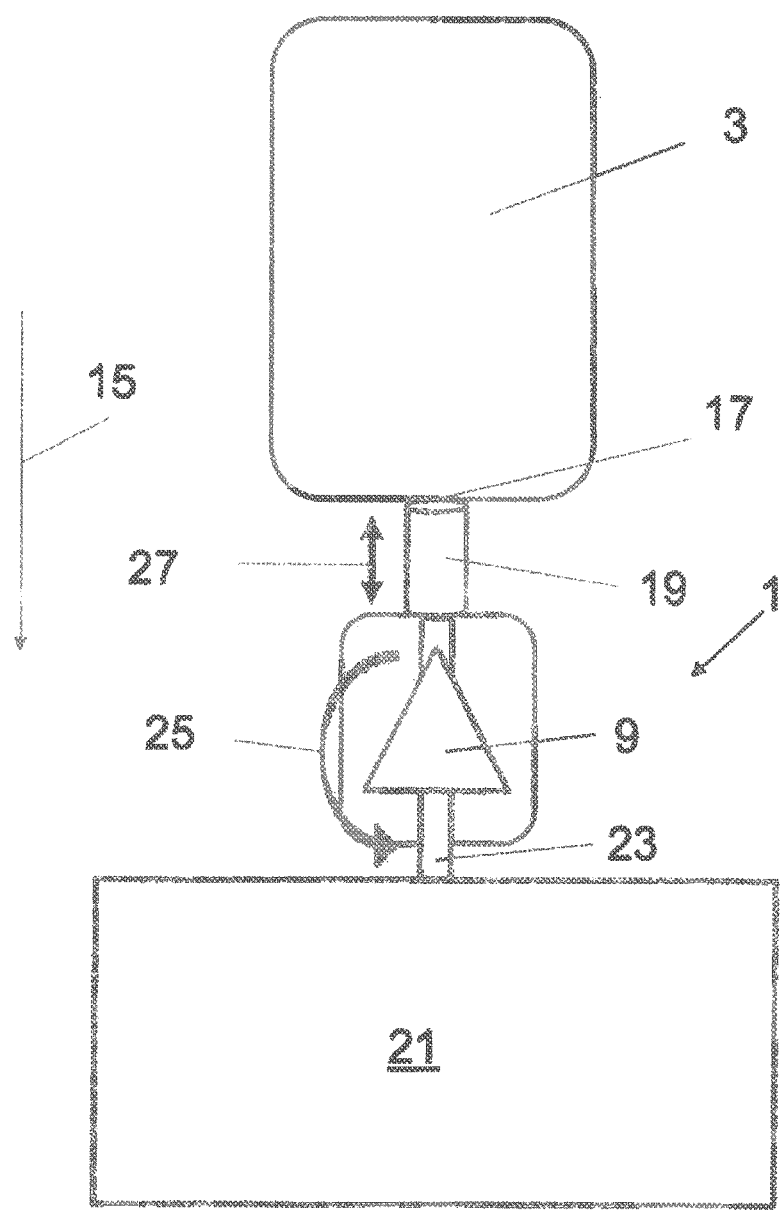
Figure 3C:
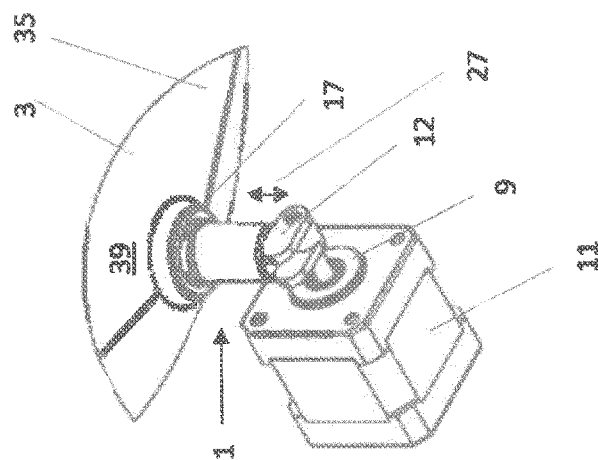
Figure 3B:
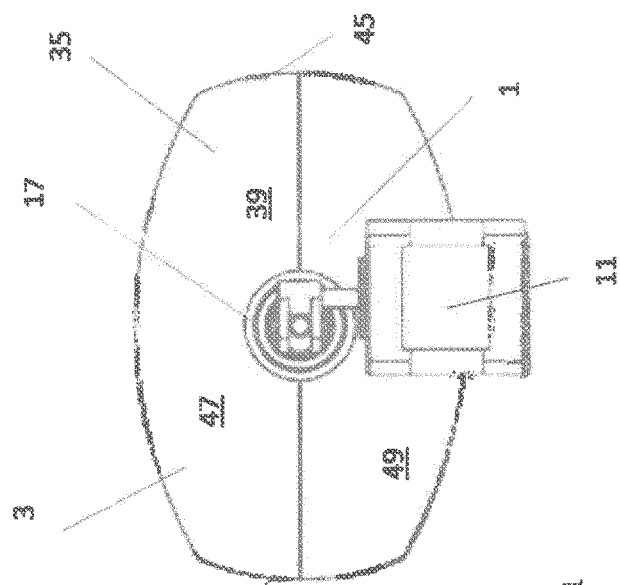
Figure 3A:
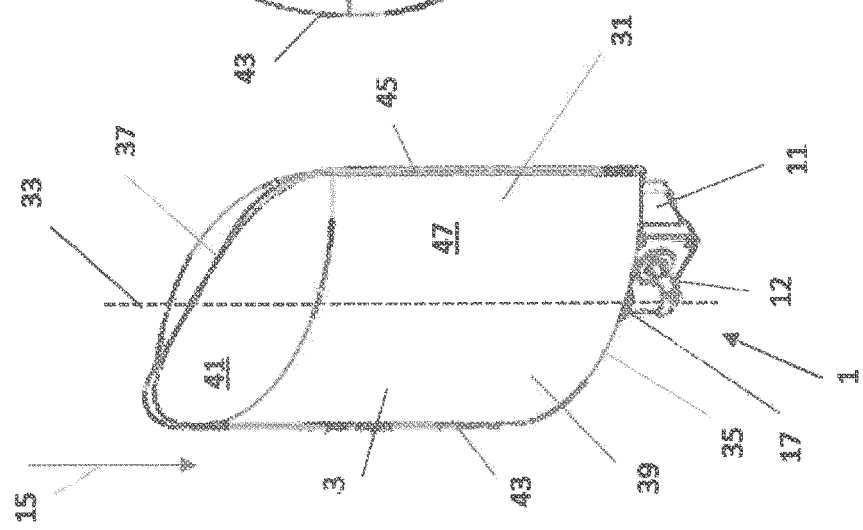
Figure 4A:
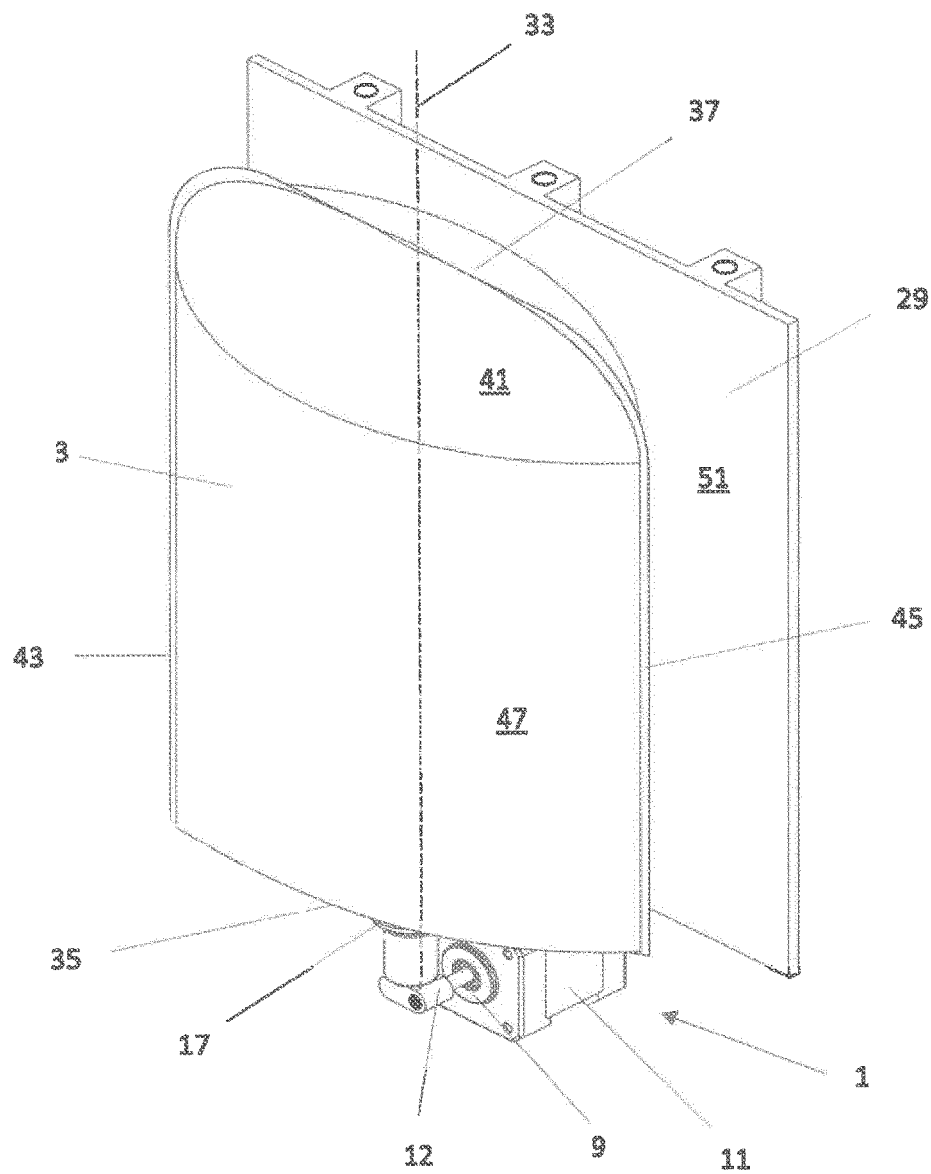
Figure 4B:
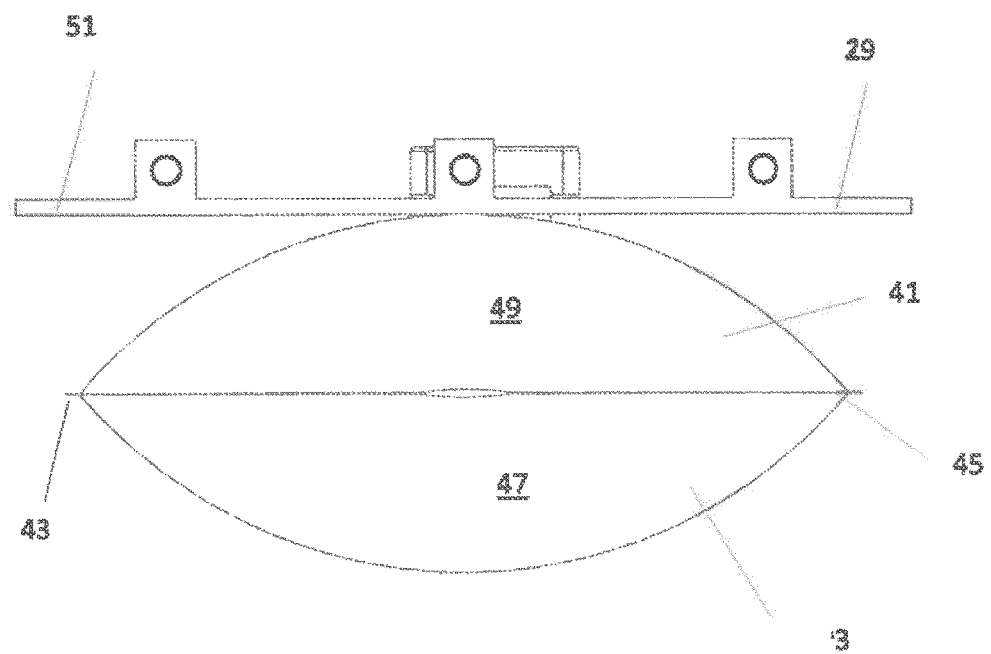
Figure 4C:
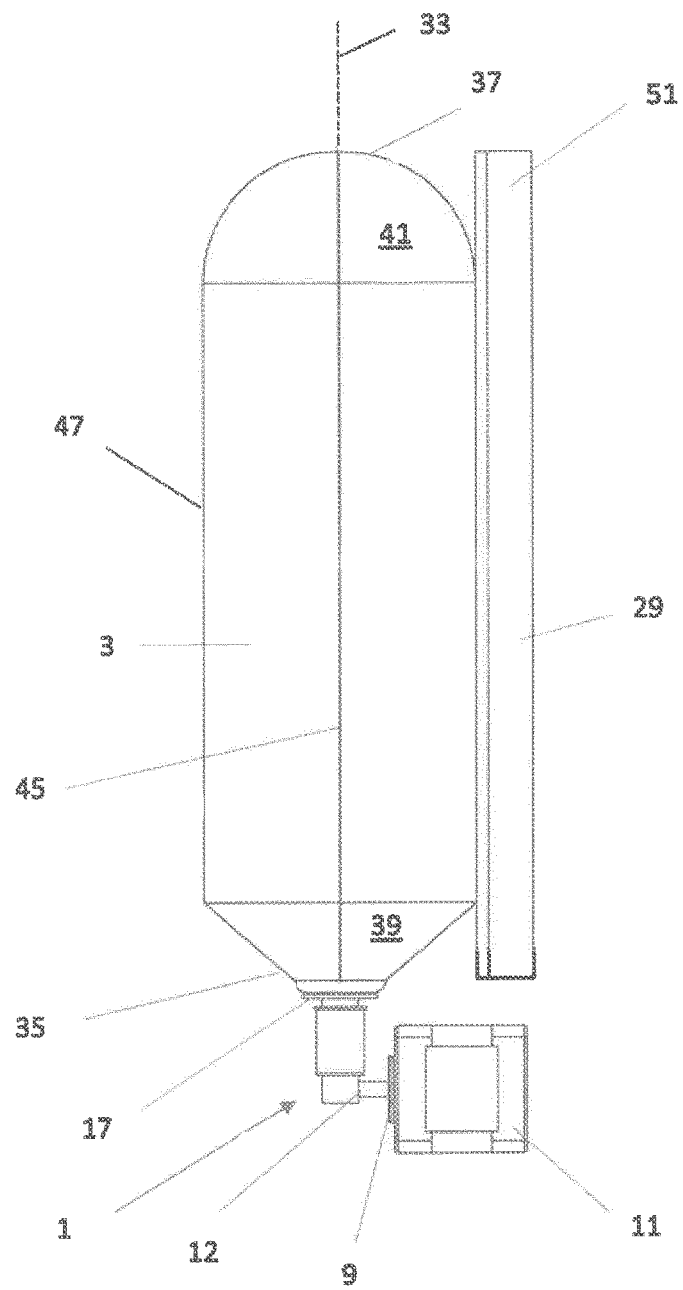
Figure 5:
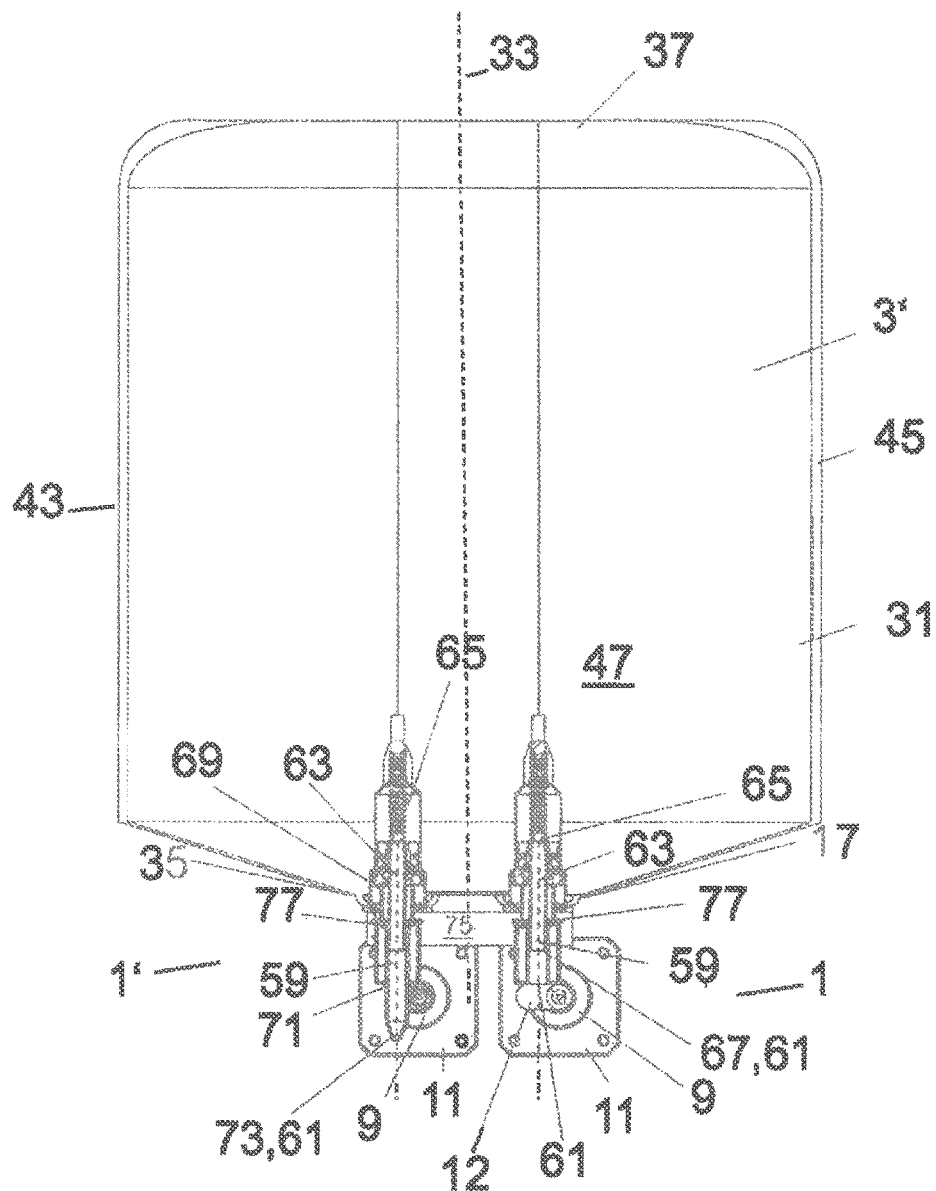

The present invention is explained below with reference only to preferred embodiment drawings, wherein FIG. 1 shows a stroke system for dosing a fluid, FIG. 2 shows a schematic drawing of a stroke system connected to a container, FIG. 3A shows a perspective side view of a first embodiment of a container with a stroke system, FIG. 3V view of the container with a stroke system shown in FIG. 3A from below, FIG. 3C shows a perspective side view of the stroke system connected to the container of FIG. 3A, FIG. 4A shows a perspective side view of a container with a stroke system and a temperature control, FIG. 4B top view of the container shown in FIG. 4A with a stroke system and a temperature control, FIG. 4C shows a side view of the container shown in FIG. 4A with a stroke system and a temperature control, and FIG. 5 shows a sectional drawing of a second embodiment of a container with a first stroke system and a second stroke system.

First, with reference to FIGS. 1 and 2, an embodiment of a stroke system 1 for dosing a fluid from a container 3 is explained.

FIG. 1 shows a stroke system for 1 dosing a fluid from a container 3 (not shown in FIG. 1). The stroke system comprises 1 a piston pump 5 with a piston 7 and a turntable 9, wherein the piston 7 can be deflected by means of the turntable 9 so that a fluid can be dosed from the container 3 (not shown in FIG. 1) by this deflection of the piston 7.

The stroke system 1 further comprises a motor 11, wherein the turntable 9 is connected or can be connected to the motor 11. The motor 11 is used to drive the turntable 9, so that pressure can be exerted on the piston 7 by means of the turntable 9. The turntable 9 is connected or can be connected to the piston pump 5 by means of a fastening element 12, for example a lever or a lever arm. The piston 7 can thus be deflected or moved by the turntable 9, and through this deflection or movement the fluid can be pumped from the container 3 and dosed correctly. The piston pump 5 and the turntable 9 can be replaceable or disposable.

The stroke system 1 further comprises a sensor 13, by means of which the level of the fluid in the container can be determined. 3

FIG. 2 shows a schematic drawing of the stroke system 1 connected to the container 3. The stroke system 1 is arranged below the container 3 in the direction of gravity 15. In the example shown in FIG. 2, the stroke system 1 is connected to an first opening 17 on the container 3. The first opening 17 corresponds to the outlet opening of the container 3 to which the stroke system 1 is connected, for example glued or welded. For this purpose, the stroke system may comprise a pipeline or hose 19 which projects into the first opening 17 and through which the fluid inside the container 3 may be pumped out. The tubing or hose 19 may be replaceable or disposable.

The stroke system 1 is connected or can be can be connected to a container or beaker 21, for example via a pipe or hose system 23. The container or beaker 21 can be, for example, a baby bottle or a coffee filter funnel or a preparation device in an apparatus for preparing a mixture of substances, in particular a medium or a buffer, into which the fluid dosed by means of the stroke system 1 is filled via the pipe or hose system 23. Thus, the fluid dosed by means of the stroke system 1 can be filled into the container or beaker 21. It should be noted that the pipe or hose system 23 is optional. It is also conceivable that the fluid is filled into the container or beaker 21 gravimetrically. The container or beaker 21 is arranged in the direction of gravity 15 below the stroke system 1 connected to the container or fluid container 3. Thereby, the stroke system 1 is arranged or positioned between the container or beaker 21 and the container or fluid container 3 in the direction of gravity 15. Thus, the fluid can be easily guided from the container 3 in the direction of the stroke system 1 by gravity and pumped from the container 3 into the container or beaker 21. The stroke system 1 has a piston pump 5 with a piston 7 (not shown in FIG. 2) and a turntable 9, which is designed as an eccentric. The eccentric is mounted on a shaft whose center lies outside the shaft axis (not shown in FIG. 2). In the example shown in FIG. 2, the piston 7 is arranged above the eccentric and its shaft axis in the direction of gravity 15. The eccentric is connected to the motor 11. In this way, a rotational movement of the 25 cam can be converted into a translational movement of the 27 piston 7 or into the piston stroke in an advantageous manner.

FIGS. 3A to 3C show a first embodiment of a container 3 connected 1 to the previously described stroke system. FIGS. 4A to 4C show the container 3 from FIGS. 3A to 3C connected to a temperature control device 29.

The container 3 comprises a flexible material and is formed from an aluminium composite foil. However, it is also conceivable that the container 3 comprises a dimensionally stable material or is formed from a dimensionally stable material. The container 3 may be made of a bioplastic or bioplastic or a bio-based plastic. The container 3 includes a housing 31 with an interior space for holding fluid, wherein the first opening 17 is in fluid communication with the interior of the container 3. The container 3 may be supplied pre-filled with a fluid by the manufacturer. The container 3 may also be designed such that the consumer cannot open the container 3, or such that the consumer cannot remove the stroke system 1. The container 3 extends along a longitudinal container axis 33 between a first end 35 and a second end 37, wherein as viewed in the direction of gravity 15, the first end 35 corresponds to a lower end 35 and the second end 37 corresponds to an upper end 37. Adjoining or adjacent to the lower end 35, the container 3 has a lower area 39. Adjoining or adjacent to the upper end 37, the container 3 has an upper area 41.

The first opening 17 is arranged at the lower end 35 of the container 3, with the longitudinal container axis 33 extending through the first opening 17. The lower area 39 of the container, as viewed transversely to the longitudinal axis 33 of the container, has a cross-section whose cross-sectional area decreases towards the lower end 35. That is, the cross-section tapers or tapers towards the lower end. The container 3 has a first side edge 43 and a second side edge 45 on opposite sides of the longitudinal axis 33 of the container, each connecting a front side 47 and a rear side 49 of the container 3. The first opening 17 is substantially the same distance from the first side edge 43 as it is from the second side edge 45.

The first opening 17 of the container 3 is connected to the stroke system 1. The container 3 may also comprise a second opening (not shown in FIGS. 3A to 3C and FIGS. 4A to 4C). The second opening may be arranged opposite the first opening 17 in the direction of the longitudinal axis 33 of the container. For example, the second opening may be arranged in the upper area 41 or adjoining or adjacent to the upper end 37 of the container 3. This arrangement of the second opening allows fluid to be refilled into the interior of the container 3 in a particularly simple manner, even when connected to the stroke system 1. The container 3 can further comprise a closure element, for example a lid for covering the second opening, with which the second opening can be closed again after the fluid has been filled in.

The stroke system 1 connected to the container 3 further comprises the temperature control device 29, which is designed to control the temperature of the fluid to be dosed by means of the stroke system 1. Like the motor 11 and the turntable 9, the temperature control device 29 can be designed as a reusable article. However, it is also conceivable that the motor 11, the turntable 9, and the temperature control device 29, like the container 3 and the piston pump 5, are designed as disposable articles and are thus interchangeable. The temperature control device 29 comprises a heating plate 51, wherein the heating plate 51 is arranged at least partially in contact with the connected container 3, and wherein the heating plate 51 at least partially adjoins or rests against the housing 31 of the container 3. The heating plate 51 comprises at least one substantially planar external surface or contact surface 53 designed to contact the housing 31 of the container 3. In the embodiment example shown in FIGS. 3A-3C and 4A-4C, the contact surface 53 at least partially rests against the rear surface 49 of the container 3.

The housing 31 of the container 3 has a contact surface 55, which is designed in such a way that the container 3 is at least partially in contact with the temperature control device 29 of the stroke system 1. The temperature control device 29 at least partially adjoins or lies against the contact surface 55. In particular, the temperature control device 29 is arranged with the container 3 and the stroke system 1 in such a way that the contact surface 53 of the heating plate 51 at least partially rests against the contact surface 55, which is arranged on the rear side 49 of the container 3.

The contact surface 55 extends in the direction of the longitudinal axis 33 of the container between the lower area 39 or lower end 35 of the container 3 and the upper area 41 or upper end 37 of the container 3 as viewed in the direction of gravity 15 when the container 3, the stroke system 1 and the temperature control device 29 are connected or coupled to one another.

The contact surface 55 extends in a area of the rear side 49 of the container 3 adjoining or adjacent to the longitudinal axis 33 of the container and is spaced from the opposing first and second side edges 43 and 45. The container 3 thus lies against the temperature control device 29 or the contact surface 53 of the heating plate 51 in such a way that the first side edge 43 and second side edge 45 are not in contact with the temperature control device 29 or the heating plate 51, but are spaced from the temperature control device 29 or the heating plate 51. contact surface 53 of the heating plate 51 such that the first side edge 43 and second side edge 45 are not in contact with the temperature control device 29 and the heating plate 51, respectively, but are spaced from the temperature control device 29 and the heating plate 51, respectively, when the container 3 is coupled to the temperature control device 29 of the stroke system 1. This embodiment is particularly advantageous for a container 3 welded at the first side edge 43 and second side edge 45. For reasons of thermal engineering, contact of the container 3 at these points is disadvantageous and should be avoided, since due to the lack of fluid as a heat-conducting medium there is a risk that the welded side edges 43, 45 will be melted and thus irreversibly damaged, so that fluid can escape from the interior of the container 3. However, it would also be conceivable for the container 3 to be designed in such a way that the entire rear side 49 of the container 3 is formed as an contact surface 55 and the heating plate 51 contacts the contact surface 55 with the entire contact surface 53, the first side edge 43 and second side edge 45 being in contact with the temperature control device 29 and with the heating plate 51, respectively (not shown in FIGS. 4A to 4C). This would increase the contact of the container 3 with the temperature control device 29, allowing for particularly effective temperature control of the fluid inside the container 3.

However, it is also conceivable that the temperature control device 29 comprises a cooling plate or a temperature control plate which can both heat and cool (not shown in FIGS. 3A to 3C and FIGS. 4A to 4C). In this case, the heating plate 51 can be replaced by a cooling plate. However, it is also conceivable that the cooling plate is arranged opposite the heating plate 51, so that the cooling plate bears against a further bearing surface which extends on the front side 47 of the container 3 along the longitudinal axis 33 of the container between the lower area 39 or lower end 35 of the container 3 and the upper area 41 or upper end 37 of the container.

The temperature control device 29 can have a fixing element with which the container 3 can be fixed or connected to the temperature control, the fixing element having at least one magnet (not shown in FIGS. 3A to 3C and FIGS. 4A to 4C). Furthermore, a control and regulating device for controlling or regulating the temperature of the temperature control device 29 or heating plate 51 and/or cooling plate can be provided (not shown in FIGS. 3A to 3C and FIGS. 4A to 4C).

FIG. 5 shows a second embodiment example of a container 3'. The second embodiment example of the container 3' differs from the first embodiment example of the container 3 in that the container 3' is designed to be connected or connectable to a further, second stroke system 1'. The container 3' thus comprises a first stroke system 1 and a second stroke system 1', which are arranged at the first, lower end 35 of the container 3'. In addition to the first opening 17, the container 3' comprises a second opening 57 to which the second stroke system 1' is connected, for example glued or welded. The first opening 17 and the second opening 57 are arranged on opposite sides of the longitudinal container axis 33. Thus, the longitudinal container axis 33 does not extend through any of the openings 17, 57.

The at least one further, second stroke system 1' is designed substantially like the first stroke system 1 and thus has at least one sensor for determining or detecting the level of the fluid in the interior of the container 3 (not shown in FIG. 5). Furthermore, each of the stroke systems 1, 1' comprises an outlet 59 with an outlet opening 61 through which the fluid can exit from the interior of the container 3'. The outlet 59 of at least one of the stroke systems 1, 1' has a cross-section transverse to its longitudinal outlet axis 63, which tapers towards the outlet opening 61. The longitudinal outlet axis 63 of each of the stroke systems 1, 1' each extends in a plane which is parallel to the plane of the longitudinal container axis 33. The container 3' or the housing of the container 3' is connected or can be connected to the stroke systems 1, 1' by means of a connection element 75. For this purpose, the connection element 75 preferably has two through holes 77 so that the stroke systems 1, 1' can be guided through the through holes 77 and can be connected to the first and second openings 17, 57 of the container 3'. The connection element 75 enables a particularly secure connection of the container 3' to the two stroke systems 1, 1'.

The outlet 59 of the first stroke system 1 extends along the longitudinal outlet axis 63 between an first end 65 and a second end 67. The outlet 59 extends substantially tubularly along the longitudinal outlet axis 63. The outlet opening 61 of the first stroke system 1 is thus arranged at the second end 67 or is adjacent to the second end 67.

In the second, further stroke system 1', the outlet 59 has a pipette-like configuration. The outlet 59 has a first outlet portion 69 extending between the first end 65 and the second end 67 as previously described in connection with the first stroke system 1. Adjoining or adjacent to the second end 67, the outlet 59 has a second outlet section 71 that also extends along the longitudinal outlet axis 63 between the second end 67 and a third end 73.

The outlet 59 of the second stroke system 1' has a cross-section in the second outlet section 71 that tapers toward the third end 73. The outlet opening 61 is located at the third end 73 and has a cross-sectional area (as viewed transversely to the longitudinal outlet axis) adjoining or adjacent to the third end 73 that is smaller than the cross-sectional area of the outlet 59 at any location of the first outlet section 69.

Both containers 3, 3' described above can be supplied pre-filled with a fluid and/or can be disposable.

The stroke system 1 described above for dosing a fluid can be used in a variety of applications, for example in the preparation of baby food from a baby food concentrate, in the preparation of a coffee, or in the biochemical field in the preparation of a liquid medium or a buffer. The previously described stroke system 1 for dosing a fluid from a container 3 can be coupled to the container 3 in such a way that a fluid can be correctly dosed from the container 3 by means of the stroke system 1. Because the stroke system 1 has a temperature control device 29, the fluid dosed by means of the stroke system 1 can be temperature controlled simultaneously or immediately before or after dosing. The stroke system 1 thus enables simplified and correct dosing of fluid. Due to the additional temperature control option by means of the temperature control device 29, the stroke system 1 enables particularly efficient and time-saving work. Particularly in the field of biochemistry, for example in the preparation of media and buffers, longer downtimes are thus avoided and efficient work is made possible.

LIST OF REFERENCE SIGNS 1, 1' Stroke system
3, 3' Container for a fluid
5 Piston pump
7 Piston
9 Turntable
11 Motor
12 Fastening element
13 Sensor
15 Direction of gravity
17 First container opening
19 Pipeline or hose
21 Container or beaker
23 Pipe or hose system
25 Rotational movement of the eccentric
27 Translational movement of the piston
29 Temperature control device
31 Housing
33 Longitudinal container axis
35 First, lower end of the container
37 Second, upper end of the container
39 Lower area of the container
41 Upper area of the container
43 First side edge of the container
45 Second side edge of the container
47 Front of the container
49 Back of the container
51 Heating plate
53 External surface or contact surface
55 Contact surface
57 Second container opening
59 Outlet
61 Outlet opening
63 Longitudinal outlet axis
65 First end of outlet
67 Second end of the outlet
69 First outlet section
71 Second outlet section
73 Third end of outlet
75 Connection element
77 Through holes

The invention claimed is:

1. Stroke system (1) for dosing a fluid from a container (3), comprising
a piston pump (5) with a piston (7), so that a fluid can be dosed from the container (3) by displacement of the piston (7), and
a temperature control device (29) for controlling the temperature of the fluid dosed by the stroke system (1),
wherein the container (3) for a fluid comprises a housing (31),
wherein the stroke system (1) is connected to the container (3),
wherein the stroke system (1) is connected to a first opening (17) on the container (3),
wherein the temperature control device (29) comprises a heating plate (51), wherein the heating plate (51) is arranged at least partially in contact with the container (3), and
wherein the heating plate (51) at least partially adjoins or rests against the housing (31) of the container (3).

2. Stroke system (1) according to claim 1,
wherein the housing (31) of the container (3) comprises a flexible material or is formed from a flexible material.

3. Stroke system (1) according to claim 1,
wherein the housing (31) of the container (3) comprises a dimensionally stable material or is formed from a dimensionally stable material.

4. Stroke system (1) according to claim 1, wherein the temperature control device (29) is controlled or regulated, wherein the temperature control device (29) is arranged in a plane that extends essentially transverse to the direction of gravity (15),
wherein the stroke system (1) comprises at least one sensor (13).

5. Stroke system (1) according to claim 1,
wherein the piston pump (5) comprises a turntable (9), and
wherein the turntable (9) is designed as an eccentric or is mounted eccentrically, and/or
wherein the turntable (9) is connected to the motor (11),
wherein the turntable (9) is arranged above the piston (7) in the direction of gravity (15).

6. Stroke system (1) according to claim 1, wherein the stroke system (1) is connected to an analysis system,
whereby the dosing of the fluid from the container (3) takes place in dependence on data determined or transmitted by the analysis system.

7. Stroke system (1) according to claim 1, wherein the piston pump (5) and the piston (7) are designed to dose a predefined amount of the fluid from the container (3) by the displacement of the piston (7).

8. Stroke system (1) for dosing a fluid from a container (3), comprising
a piston pump (5) with a piston (7), so that a fluid can be dosed from the container (3) by displacement of the piston (7), and
a temperature control device (29) for controlling the temperature of the fluid dosed by the stroke system (1),
wherein the container (3) for a fluid comprises a housing (31),
wherein the stroke system (1) is connected to the container (3),
wherein the stroke system (1) is connected to a first opening (17) on the container (3),
additionally comprising a fixing element,
wherein the temperature control device (29) is fixed or connected to the container by the fixing element,
wherein the fixing element comprises at least one magnet.

9. Container (3) for a fluid comprising:
a housing (31) with an interior space for holding fluid, and
a first opening (17) with fluid connection to the interior space,
wherein the container (3) is connected to a stroke system (1),
the stroke system (1) comprises a piston pump (5) with a piston (7) so that a fluid can be dosed from the container (3) by displacement of the piston (7),
additionally comprising a temperature control device (29) for controlling the temperature of the fluid dosed by the stroke system (1), and
wherein the housing (31) of the container (3) has a contact surface (55) configured such that the container (3) is at least partially in contact with the temperature control device (29).

10. Container (3) according to claim 9, wherein the stroke system (1) is connected to the first opening (17) of the container (3).

11. Container (3) according to claim 9,
wherein the housing (31) of the container (3) comprises a flexible material or is formed from a flexible material.

12. Container (3) according to claim 9, wherein the housing (31) of the container (3) comprises a dimensionally stable material or is formed from a dimensionally stable material, and/or
wherein the container (3) comprises a second opening,
wherein the container (3) comprises a lid for covering the second opening.

13. Container according to claim 9,
wherein the temperature control device (29) is arranged in a plane extending essentially transverse to the direction of gravity (15), and
wherein the container (3) at least partially rests against the temperature control device (29), and/or
the stroke system (1) comprising at least one sensor (13) for determining or detecting the level of the fluid on the interior of the container (3).

14. Container (3') according to claim 9,
wherein the container (3') is connected to at least one further stroke system (1'),
wherein the at least one further stroke system (1') comprises at least one sensor for determining or detecting the filling level of the fluid on the interior of the container (3').

15. Container (3') according to claim 14,
wherein each of the stroke systems (1, 1') comprises an outlet (59) having an outlet opening (61) through which the fluid can exit from the interior of the container (3'),
wherein the outlet (59) of at least one of the stroke systems (1, 1') has a cross-section transverse to its longitudinal outlet axis (63) which tapers towards the outlet opening (61).

16. Container (3, 3') according to claim 9, wherein the container (3, 3') is deliverable pre-filled with a fluid and/or wherein the container (3, 3') is designed as a disposable article.

17. Container (3) for a fluid comprising:
a housing (31) with an interior space for holding fluid, and
an first opening (17) with fluid connection to the interior space,
wherein the container (3) is connected to a stroke system (1), the stroke system (1) comprising a piston pump (5) with a piston (7) so that a fluid can be dosed from the container (3) by displacement of the piston (7),
additionally comprising a temperature control device (29) for controlling the temperature of the fluid dosed by the stroke system (1),
wherein the container (3) is designed so that the container (3) can be coupled to the temperature control device (29),
wherein the housing (31) of the container (3) has a contact surface (55) which is designed such that the container (3) is at least partially in contact with the temperature control device (29),
wherein the temperature control device (29) at least partially adjoins or rests against the contact surface (55),
wherein the temperature control device (29) comprises a heating plate (51).

18. Container (3) for a fluid comprising:
a housing (31) with an interior space for holding fluid, and
a first opening (17) with fluid connection to the interior space,
wherein the container (3) is connected to a stroke system (1),
the stroke system (1) comprising a piston pump (5) with a piston (7) so that a fluid can be dosed from the container (3) by displacement of the piston (7),
additionally comprising a temperature control device (29) for controlling the temperature of the fluid dosed by the stroke system (1),
wherein the container (3) is designed so that the container (3) can be coupled to the temperature control device (29), wherein the container (3) is configured such that the temperature control device (29) is fixed or connected to the container (3) by a fixing element,
wherein the fixing element is a magnet.

\* \* \* \* \*